US010255166B2

(12) United States Patent
Murthy et al.

(10) Patent No.: US 10,255,166 B2
(45) Date of Patent: Apr. 9, 2019

(54) DETERMINATION OF VALID INPUT SEQUENCES FOR AN UNKNOWN BINARY PROGRAM

(71) Applicant: FUJITSU LIMITED, Kawasaki-shi, Kanagawa (JP)

(72) Inventors: Praveen Murthy, Fremont, CA (US); Bogdan Copos, Davis, CA (US)

(73) Assignee: FUJITSU LIMITED, Kawasaki (JP)

( * ) Notice: Subject to any disclaimer, the term of this patent is extended or adjusted under 35 U.S.C. 154(b) by 733 days.

(21) Appl. No.: 14/792,507

(22) Filed: Jul. 6, 2015

(65) Prior Publication Data
US 2016/0259711 A1 Sep. 8, 2016

Related U.S. Application Data

(60) Provisional application No. 62/128,892, filed on Mar. 5, 2015.

(51) Int. Cl.
*G06F 11/36* (2006.01)
*H04L 29/06* (2006.01)
*G06F 9/44* (2018.01)

(52) U.S. Cl.
CPC ...... *G06F 11/3672* (2013.01); *G06F 11/3644* (2013.01); *G06F 11/3668* (2013.01)

(58) Field of Classification Search
CPC ............. G06F 11/3644; G06F 11/3668; G06F 11/3672; G06F 11/3696
See application file for complete search history.

(56) References Cited

U.S. PATENT DOCUMENTS

| 7,178,063 | B1* | 2/2007 | Smith ................ G06F 11/3688 714/38.1 |
| 7,873,945 | B2 | 1/2011 | Musuvathi et al. |
| 9,836,388 | B1* | 12/2017 | Moniz ................ G06F 11/3672 |
| 2004/0031021 | A1* | 2/2004 | Hunt .................. G06F 11/3668 717/131 |

(Continued)

OTHER PUBLICATIONS

Wikipedia, ".bss", 2014, downloaded from the Wayback Machine Internet Archive at <url>:https://web.archive.org/web/20140921145723/https://en.wikipedia.org/wiki/.bss.*
Casey Klein et al., "Random Testing for Higher-Order, Stateful Programs," 2010, Proceedings of the ACM international conference on Object oriented programming systems languages and applications, pp. 555-566, downloaded from the Internet at <url>:https://dl.acm.org/citation.cfm?id=1869505. (Year: 2010).*

(Continued)

*Primary Examiner* — Thuy Dao
*Assistant Examiner* — Stephen D Berman
(74) *Attorney, Agent, or Firm* — Maschoff Brennan

(57) ABSTRACT

A method to determine a valid input sequence for an unknown binary program is provided. The method may include obtaining an input sequence for an unknown binary program. The method may also include obtaining a memory address range for each of one or more variables in the unknown binary program and executing an instrumented version of the unknown binary program with the input sequence as an input to the instrumented version of the unknown binary program. The method may also include recording one or more memory addresses accessed during the execution of the instrumented version of the unknown binary program and determining that the unknown binary program accepts the input sequence as valid based on one or more of the one or more recorded memory addresses corresponding to the memory address range of one or more of the variables in the unknown binary program.

20 Claims, 5 Drawing Sheets

(56) References Cited

U.S. PATENT DOCUMENTS

| | | | | |
|---|---|---|---|---|
| 2004/0181713 | A1* | 9/2004 | Lambert | G06F 11/3684 714/48 |
| 2007/0074175 | A1* | 3/2007 | Bengtsson | G06F 11/3644 717/130 |
| 2009/0007077 | A1* | 1/2009 | Musuvathi | G06F 11/3688 717/130 |
| 2009/0089756 | A1* | 4/2009 | Danton | G06F 11/3644 717/124 |
| 2014/0075242 | A1* | 3/2014 | Dolinina | G06F 11/3672 714/27 |
| 2014/0089904 | A1* | 3/2014 | Wray | G06F 11/3672 717/135 |
| 2014/0123110 | A1* | 5/2014 | Wan | G06F 11/3672 717/124 |
| 2014/0181794 | A1* | 6/2014 | Grawrock | G06F 11/3636 717/128 |
| 2015/0212920 | A1* | 7/2015 | Kraus | G06F 11/3466 717/127 |

OTHER PUBLICATIONS

Casey Klein et al., "Random testing for higher-order, stateful programs," 2010 [retrieved on Nov. 10, 2018], ACM SIGPLAN Notices—OOPSLA '10, vol. 45 Issue 10, pp. 555-566, downloaded from the Internet at <url>:https://dl.acm.org. (Year: 2010).*

Christopher Michael et al., "Generating software test data by evolution," 2001 [retrieved on Nov. 10, 2018], IEEE Transactions on Software Engineering,vol. 27, Issue 12, pp. 1085-1110, downloaded from the Internet at <url>: https://ieeexplore.ieee.org. (Year : 2001).*

Jacob Burnim et al., "WISE: Automated test generation for worst-case complexity," 2009 [retrieved on Nov. 10, 2018], IEEE 31st International Conference on Software Engineering, pp. 463-473, downloaded from the Internet at <url>: https://ieeexplore.ieee.org. (Year: 2009).*

* cited by examiner

DETERMINATION OF VALID INPUT SEQUENCES FOR AN UNKNOWN BINARY PROGRAM

FIELD

The embodiments discussed herein are related to the determination of valid input sequences for an unknown binary program.

BACKGROUND

Efficient testing of a binary file may be improved by knowledge of which inputs are valid for the binary file. The binary file may include code and routines that a human may interpret as text. However, the text included in the code and routines of the binary file are not human-readable. It is impossible for human testers of the binary file to determine valid inputs for the binary file by reviewing the code and routines of the binary file because the code and routines are not human readable. As a result, the human testers may review specifications, documentation or source code associated with the binary file in order to determine which inputs are valid for the binary file. These valid inputs may then be used to achieve more efficient testing of the binary file.

SUMMARY

According to an aspect of an embodiment, a method to determine a valid input sequence for an unknown binary program is disclosed. The method may include obtaining an input sequence for an unknown binary program. The input sequence may include two or more different inputs. The inputs for the input sequence may be determined as valid inputs for the unknown binary program. The method may also include obtaining a memory address range for each of one or more variables in the unknown binary program and executing an instrumented version of the unknown binary program with the input sequence as an input to the instrumented version of the unknown binary program. The method may also include recording one or more memory addresses accessed during the execution of the instrumented version of the unknown binary program and determining that the unknown binary program accepts the input sequence as valid based on one or more of the one or more recorded memory addresses corresponding to the memory address range of one or more of the variables in the unknown binary program.

The object and advantages of the embodiments will be realized and achieved at least by the elements, features, and combinations particularly pointed out in the claims.

It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
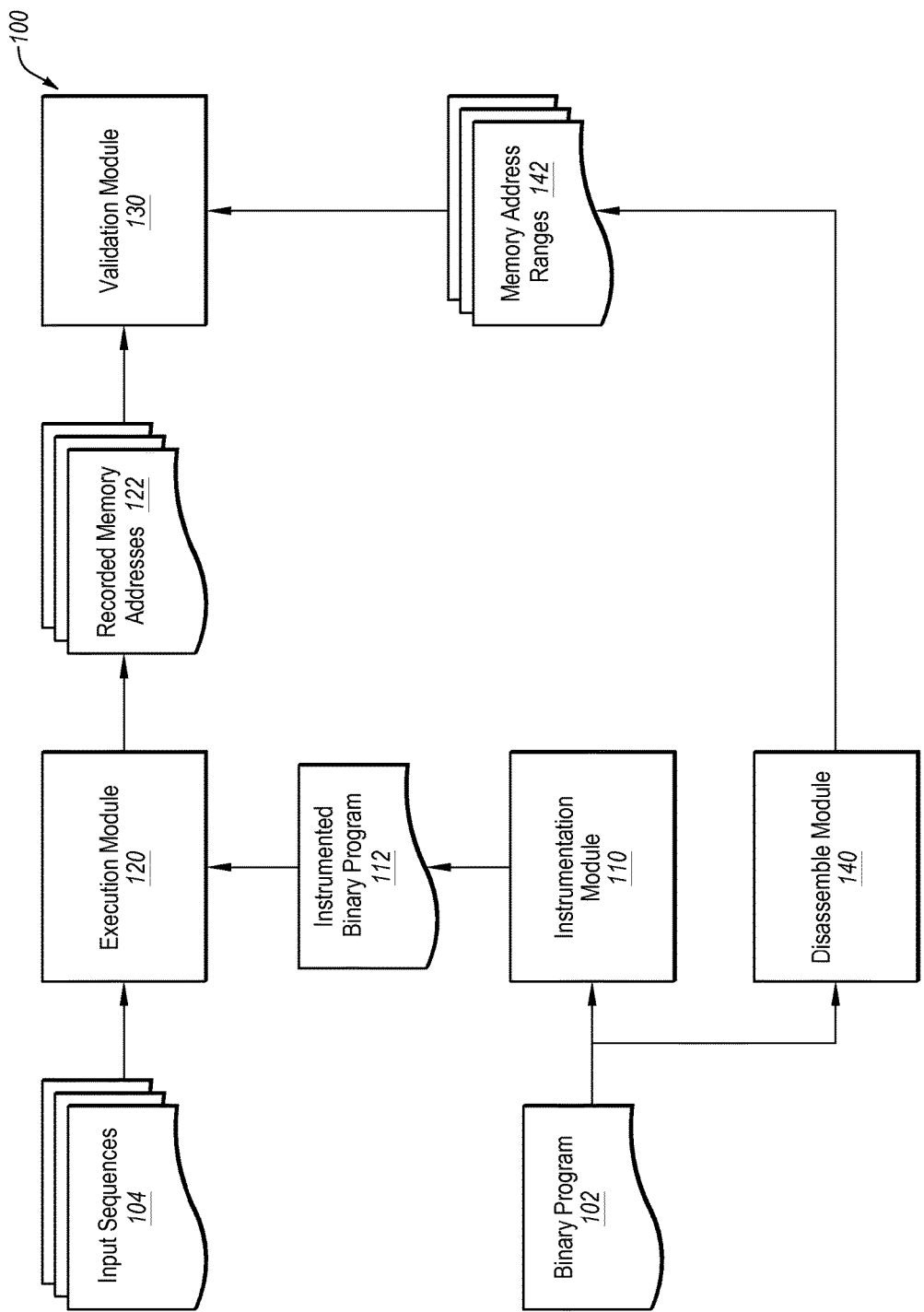
FIG. 1 illustrates an example input sequence determination process.

An acceptable method to determine valid input sequences for an unknown binary program may include various elements. One element may include covering a high percentage of the code and routines included in the unknown binary program (excluding dead code). For example, one or more test inputs or input sequences selected for testing an unknown binary program may cover one hundred percent or near one hundred percent of the code and routines for the unknown binary program (e.g., ninety percent to one hundred percent of the binary program, excluding dead code and routines). Some current methods rely on generation of random test inputs for testing the unknown binary program. Unfortunately, testing methods that include generation of random test inputs for testing an unknown binary program may be unable to consistently cover a high percentage of the code and routines for the unknown binary program because randomly generated test inputs may be inherently incompatible with the goal of consistently covering a high percentage of the code and routines for the unknown binary program. As a result, some existing methods are not able to consistently cover a high percentage of the code and routines for the binary program, so these methods are not considered acceptable.

Another element of an acceptable method to determine valid input sequences for an unknown binary program may include the ability to be effectively implemented without a specification, documentation, or source code associated with the unknown binary program. This requirement may be beneficial in the field of autonomous software security where it is beneficial for a computer system to automatically determine vulnerabilities in software. In some situations, an unknown binary program may be available to human testers of the unknown binary program, but the specification, documentation and source code associated with the unknown binary program may be unavailable. Some existing methods attempt to determine valid inputs for an unknown binary program. However, these methods rely on randomly generated test inputs or have other deficiencies.

Yet another element of an acceptable method for determining valid input sequences for an unknown binary program may include platform independence. Platform independence may beneficially improve the portability of the methodology as well as provide other benefits.

Currently, there does not appear to be a method to determine valid input sequences for an unknown binary program that includes the elements discussed above. Various methods have been used to determine valid input sequences for an unknown binary program. However, none of these methods provide all or even some of the elements discussed above of an acceptable method for determining valid input sequences for an unknown binary program.

One such method may be referred to as "symbolic execution." The symbolic execution approach includes determining inputs for the unknown binary program which may drive the program along various execution paths including possibly crashing the program. This approach may be successful in some isolated instances. However, one deficiency associated with the symbolic execution approach is the use of a source file associated with an unknown binary program. In some instances, the source file may be unavailable. As a result, implementation of the symbolic execution approach may not be possible in these instances. Other deficiencies may be that the symbolic execution approach may not scale well and thus may not work with many common scenarios. For example, the symbolic execution approach has known problems working with programs that include floating point arithmetic or include non-linear constraints on the input gathered during execution of the program. For at least these reasons, the symbolic execution approach is not an acceptable method for determining valid inputs for an unknown binary program.

Another method is known as a "black-box fuzzing." This approach may include selecting a string and randomly altering the string. The string may be fed to an unknown binary program as an input after each alteration. Although this approach may work given enough time, most of the inputs generated by black-box fuzzing are invalid inputs. This is problematic since valid inputs are needed in order to mutate and identify additional valid inputs. An additional problem associated with black-box fuzzing is that this approach does not guarantee high coverage of an unknown binary program since it is reliant on random inputs, and so, it is impossible to know whether the results of implementing black-box fuzzing achieve high coverage.

Another method is known as "white-box fuzzing." The white-box fuzzing approach is similar to black-box fuzzing, with the exception that valid inputs are used to gather symbolic constraints, which may then be analyzed to produce test inputs. The white-box fuzzing approach may be considered an improvement over black-box fuzzing since it includes at least some inputs that are not arrived at randomly. However, the white-box approach requires valid inputs as a prerequisite before it may be implemented to determine test input. In some instances valid inputs will not be available as seeds for the white-box fuzzing approach. For this reason, the white-box fuzzing approach implemented alone may be unable to solve the problem of determining valid inputs for an unknown binary program.

Another method is known as "unit testing," in which the code for a program is divided into units and tested systematically. Although unit testing may be able to achieve high coverage testing of a binary program in some instances, this approach always requires source files or other documentation associated with an unknown binary program binary such as the specification for the unknown binary program. Without this information, unit testing may not be implemented. As such, the unit testing approach is unable to solve the problem of determining valid inputs for an unknown binary program because it requires source files or some other documentation. Another deficiency associated with the unit testing approach is that it is platform dependent. The unit testing approach is also considered to be slow and expensive.

Another method is known as "specification-based testing". However, as the name implies, the specification-based testing approach always requires source files or other documentation associated with an unknown binary program. As such, this approach is unable to solve the problem of determining valid inputs for an unknown binary program because it requires source files or some other documentation. Similar to unit testing, the specification-based testing approach is also platform dependent and considered to be slow and expensive.

Other methods may include "reverse code engineering." Reverse code engineering approaches may include: the "information exchange analysis" approach; the "disassembly" approach; and the "decompilation" approach. The information exchange analysis approach may not be effective if no information is exchanged by an unknown binary program, and so, this approach is limited and not acceptable for this reason. The disassembly approach relies on a static or dynamic analysis of raw assembly code, which has a number of deficiencies. For example, static or dynamic analysis of raw assembly code is computationally expensive, imprecise, does not scale well and likely to introduce significant performance overheads. The decompilation approach attempts to reconstruct the source code associated with an unknown binary program and proceed with the testing using the source code and the unknown binary program. However, in practice the decompilation approach does not work in many situations and may render a source code file that is unusable or not high quality because in actuality it differs substantially from the original source code file it attempts to reconstruct.

Some embodiments discussed in this disclosure are related to systems and/or methods to determine valid input sequences for an unknown binary program. In these and other embodiments, a valid input sequence may be a sequence of two or more inputs previously determined as valid inputs for the unknown binary program. By determining the valid input sequences for the unknown binary program, the unknown binary program may be tested without any knowledge of the unknown binary program.

In some embodiments, an input sequence for the unknown binary program may be determined as valid based on executing the unknown binary program with the input sequence. During the execution of the unknown binary program using the input sequence, one or more memory addresses accessed may be recorded. The memory addresses accessed may be compared with a memory address range for each of one or more variables in the unknown binary program. When one or more of the recorded memory addresses correspond to the memory address range of one or more of the variables on the comparison, it may be determined that the input sequence is likely a valid input sequence that causes the unknown binary program to move to a new state.

In some embodiments, the systems and/or methods described in this disclosure may not rely on random input generation. In this way, the systems and/or methods described in this disclosure may achieve high coverage of an unknown binary program using valid input sequence. By comparison, other techniques that rely on random input generation, such as black-box fuzzing and others may be unable to achieve high coverage of an unknown binary program.

In some embodiments, the systems and/or methods described in this disclosure may also be platform independent. As a result, the systems and/or methods described in this disclosure may be portable and used in a variety of operating environments. In some embodiments, the systems and/or methods described in this disclosure may also be successfully implemented without source code or documentation associated with an unknown binary program. In some embodiments, the systems and/or methods described in this disclosure may also be implemented without packet sniffing, bus analysis or any other methodology that relies on information exchange. As a result, the systems and/or methods described in this disclosure may be implemented without the use of reverse code engineering techniques.

FIG. 1 illustrates an example input sequence determination process 100, arranged in accordance with at least one embodiment described in this disclosure. In some embodiments, the process 100 may use an instrumentation module 110, an execution module 120, and a validation module 130 to determine a valid input sequence for an unknown binary program 102.

The instrumentation module 110 may be configured to receive an unknown binary program 102. The unknown binary program 102 may be an entire binary program or a partial binary program, such as one or more functions or other aspects of a program. In these and other embodiments, the unknown binary program 102 may include a compiled version of a program. The program may include code and routines describing the functionality of the program. The code and routines of the program may define inputs that may be valid for the program and the unknown binary program 102 which is a compiled version of the program. In some embodiments, the inputs for the program may include one or more input strings. An input not defined as valid by the code and routines may be an invalid input for the program and thus for the unknown binary program 102.

In some embodiments, the unknown binary program 102 may be a stateful program. In these and other embodiments, a stateful program may be a program that includes memory of the past. In a stateful program, previous transactions may be remembered and may affect the current transaction. For example, information about previous data inputs received may be stored in variables and used to affect the processing of a current data input. As a stateful program, the program may not be a stateless program. In these and other embodiments, a stateless program may be a program that includes no memory of the past. As a result, every request or transaction may be an independent request or transition that may be performed by the program as if it were being done for the very first time and unrelated to previous requests or transactions. Thus, subsequent inputs are independent of other inputs, and previous inputs do not affect the subsequent results or program response.

The unknown binary program 102 may include code and routines encoded in binary form and stored on a non-transitory computer-readable storage medium for execution by a processing device. Although the code and routines of the unknown binary program 102 may include portions that may be interpreted by a human as text, the code and routines of the unknown binary program 102 may not be human-readable. In these and other embodiments, the code and routines may be machine readable. For example, the code and routines may be binary or some other machine readable format.

The unknown binary program 102 may be "unknown" because valid inputs for the unknown binary program 102 may be unknown. For example, the specification, documentation, or source code associated with the unknown binary program 102 may not be available to a human tester or other testing equipment of the unknown binary program 102. As a result, the human tester or other testing equipment tester may not be able to determine valid inputs for the unknown binary program 102.

The instrumentation module 110 may be configured to generate an instrumented binary program 112 based on the unknown binary program 102. In these and other embodiments, to generate the instrumented binary program 112, the instrumentation module 110 may instrument the unknown binary program 102. To instrument the unknown binary program 102, the instrumentation module 110 may input additional code instructions in the unknown binary program 102. The additional code instructions may output information about the execution or run time of the unknown binary program 102. For example, the additional code instructions may output information concerning the memory addresses accessed during the execution of the unknown binary program 102.

In some embodiments, the instrumentation module 110 may include a binary instrumentation program, such as PIN or some other binary instrumentation program. The instrumentation module 110 may provide the instrumented binary program 112 to the execution module 120.

The execution module 120 may be configured to receive the instrumented binary program 112 and the input sequences 104. In some embodiments, the input sequences 104 may each include two or more different inputs for the unknown binary program 102. In some embodiments, inputs for the unknown binary program 102 may have been previously discovered and determined to be valid inputs for the unknown binary program 102. Having determined the input for the unknown binary program 102, however, does not indicate a valid sequence for providing the inputs to the unknown binary program 102. For example, it may be discovered that the unknown binary program 102 recognizes four different inputs. After receiving one of the inputs, the unknown binary program 102 may expect another or the same one of the inputs. In these and other embodiments, there may be sixteen different two-input long sequences of the inputs that may be provided to the unknown binary program 102. The process 100 may be configured to determine which of the sixteen different two-input long sequences of the inputs are valid input sequences for the unknown binary program 102.

In some embodiments, after determining a valid two-input long sequence, the process 100 may determine if there are valid three-input long, four-input long, or five-input long sequences or other lengths of sequences. In some embodiments, as noted above, the unknown binary program 102 may be a stateful program. In these and other embodiments, after entering another state by entering an input or sequence of inputs, additional inputs for the unknown binary program 102 may be discovered. In these and other embodiments, the process 100 may use the additional inputs when determining valid inputs sequences.

In some embodiments, the two or more different inputs in a sequence may be ordered, such that the inputs are provided to the unknown binary program 102 in their associated order. For example, a first input in one of the input sequences 104 may be provided to the unknown binary program 102 first and a second input in one of the input sequences 104 may be provided to the unknown binary program 102 second.

In some embodiments, the inputs used for the input sequences 104 may each include a command for the unknown binary program 102 and an argument associated with the command. The arguments may be expected by the unknown binary program 102 after receiving the command. For example, a command may be a "call" command in the unknown binary program 102 that results in the unknown binary program 102 calling a particular function. In these and other embodiments, the argument associated with the "call" command may be an internal function of the unknown binary program 102 that may be called at that point of execution of the unknown binary program 102. As another example, the command in the unknown binary program 102 may be an "authorize" command that allows for increased functionality in the unknown binary program 102. In these and other embodiments, the argument of the "authorize" command may be a token or password used by the unknown binary program 102 to allow the unknown binary program 102 to execute other processes of the unknown binary program 102. A further description of how to determine a valid command and argument for an input sequence may be described with respect to FIG. 2. Alternately or additionally, a further description of a construction of the input sequences 104 may be described with respect to FIG. 2.

The execution module 120 may be configured to execute the instrumented binary program 112 separately for each of the input sequences 104. In these and other embodiments, each execution of the instrumented binary program 112 may be performed using one of the input sequences 104 as inputs for the instrumented binary program 112. For example, if there are three input sequences 104, the execution module 120 may execute the instrumented binary program 112 three times, once for each of the three input sequences 104.

During each execution of the instrumented binary program 112 using one of the input sequences 104, the execution module 120 may be configured to record memory addresses accessed by the instrumented binary program 112. In these and other embodiments, the instrumented binary program 112 when executed may output the memory addresses accessed. The execution module 120 may receive the memory addresses accessed and record them. In some embodiments, the memory addresses accessed may include the memory addresses written to during the execution of the instrumented binary program 112. Alternately or additionally, the memory addresses accessed may include the memory addresses read from during the execution of the instrumented binary program 112. Alternately or additionally, the memory addresses accessed may include the memory addresses both written to and read from during the execution of the instrumented binary program 112.

The execution module 120 may thus generate multiple sets of recorded memory addresses 122. Each of the sets of recorded memory addresses 122 may be generated by one execution of the instrumented binary program 112. For example, the memory addresses recorded during one execution of the execution module 120 using one of the input sequences 104 may form one of the sets of recorded memory addresses 122. Thus, each set of the sets of recorded memory addresses 122 may correspond and be associated with the one of the input sequences 104. The sets of recorded memory addresses 122 may be provided to the validation module 130.

The disassemble module 140 may be configured to provide information about the unknown binary program 102 to the validation module 130. In some embodiments, the disassemble module 140 may be configured to disassemble the unknown binary program 102. Disassemble of the unknown binary program 102 may provide detailed information about unknown binary program 102. For example, in some embodiments, the disassemble module 140 may be configured to translate the unknown binary program 102 from a machine language into assembly language.

Based on the disassembled unknown binary program 102, the disassemble module 140 may be configured to determine a memory address range 142 for one or more variables in the data and Block Started by Symbol (BSS) memory sections of the unknown binary program 102. In some embodiments, the disassemble module 140 may determine the memory address ranges 142 for one or more of either static variables, global variables, or both static and global variables in the unknown binary program 102. In some embodiments, the disassemble module 140 may include a program to determine the memory address ranges 142 about the unknown binary program 102. For example, the disassemble module 140 may include programs such as objdump, TDUMP, DUMPBIN, readelf, or some other program to determine the memory address ranges 142 about the unknown binary program 102. The disassemble module 140 may provide the memory address ranges 142 to the validation module 130.

The validation module 130 may use the information from the disassemble module 140 to determine whether one or more of the recorded memory addresses 122 correspond with one or more of the memory address ranges 142. One of the recorded memory addresses 122 may correspond with one of the memory address ranges 142 when the one of the recorded memory addresses 122 is within the one of the memory address ranges 142. The one of the recorded memory addresses 122 being within the one of the memory address ranges 142 may indicate that a variable that corresponds with the memory address range was either read from or written to during execution of the unknown binary program 102.

Based on the correspondence between one or more of the recorded memory addresses 122 and one or more of the memory address ranges 142, the validation module 130 may determine that the input sequence 104 that when executed produced the one or more of the recorded memory addresses 122 is a valid input sequence 104. In these and other embodiments, the input sequence 104 being valid may indicate that the input sequence 104 is accepted by the unknown binary program 102 as a valid input sequence. In some embodiments, the input sequence 104 being valid may indicate that the input sequence 104 causes the unknown binary program 102 to enter another state. For example, a valid input sequence 104 when provided to the unknown binary program 102 during execution of the unknown binary program 102 may cause the unknown binary program 102 to transition from first state to a second state of operation.

In some embodiments, the validation module 130 may determine that an input sequence 104 is valid based on the validation module 130 determining that a global variable or a static variable was either read from or written to during execution of the unknown binary program 102 using the input sequence 104. Alternately or additionally, the validation module 130 may determine that an input sequence 104 is valid based on the validation module 130 determining that a global variable or a static variable was both read from and written to during execution of the unknown binary program 102 using the input sequence 104. Alternately or additionally, the validation module 130 may determine that an input sequence 104 is valid based on the validation module 130 determining that both a global variable and a static variable were both read from or written to during execution of the unknown binary program 102 using the input sequence 104. The validation module 130 may determine the validity for each of the input sequences 104 based on the recorded memory addresses 122 for each of the input sequences 104 and the memory address ranges 142.

An example of the process 100 follows. The input sequences 104 may include four different sequences, namely "HI OK," "AUTH OK," "AUTH <token>," and "HI <token>." In these and other embodiments, the inputs may include "HI," "OK," "AUTH," and "<token>." These inputs may be combined to form the four different input sequences 104.

The execution module 120 may execute the instrumented binary program 112 with each of the four different input sequences 104. For the "HI OK," "AUTH OK," and "HI <token>" input sequences 104, the validation module 130 may determine that a global variable or static variable in the instrumented binary program 112 was not written to or read from during the execution of the instrumented binary program 112. For the AUTH <token> input sequence 104, the validation module 130 may determine that a global variable or static variable in the instrumented binary program 112 was either written to or read from during the execution of the instrumented binary program 112. As a result, the validation module 130 may determine that the "AUTH <token>" input sequence is a valid input sequence for the unknown binary program 102. Modifications, additions, or omissions may be made to the process 100 without departing from the scope of the present disclosure.

Figure 2:
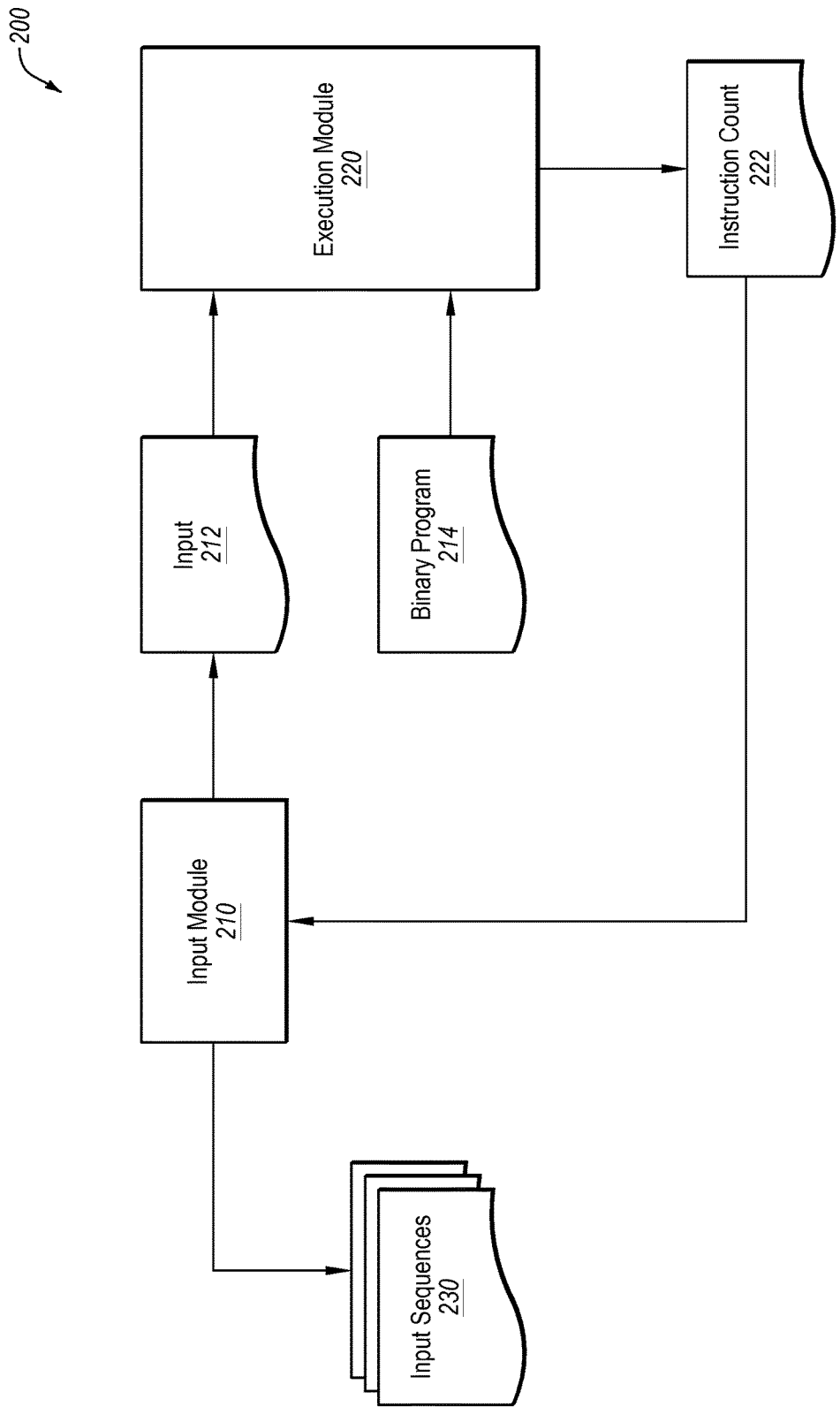
FIG. 2 illustrates an example input determination process.

FIG. 2 illustrates an example input determination process 200, which may be arranged in accordance with at least one embodiment described in this disclosure. The process 200 may use an input module 210 and an execution module 220 to determine one or more inputs 212 for an unknown binary program 214 and input sequences 230 for the unknown binary program 214. A system and method to determine the valid inputs for a given state in the unknown binary program 214 is described in co-pending U.S. patent application Ser. No. 14/620,106 filed on Feb. 11, 2015, which is incorporated by reference in its entirety in this disclosure.

In some embodiments, the process 200 may determine inputs 212 for a state of the unknown binary program 214. In some embodiments, the inputs 212 may be one or more printable characters in an input string which may include one or more indices. An input string for the program may include one or more indices and one or more printable characters. An index may include the position in the string at which the printable character occurs. For example, if the input strings that are accepted are "Hello" and "Howdy," then the indices are "0," "1," "2," "3," and "4." In this example, the valid character at index "0" includes the printable character "H." The valid characters at index "1" include the printable characters "e" and "o." The valid characters at index "2" include "l" and "w." The valid characters at index "3" include "l" and "d." The valid characters at index "4" include "o" and " " y.

To be considered a valid input string, each of the characters included in the input string may be valid for the unknown binary program 214. For any given index of the valid input string, a majority of the printable characters available for use in the input string may be invalid. The process 200 may be configured to iteratively test a set of printable characters to determine if they are valid characters for different indexes of a valid input string for the unknown binary program 214.

The input module 210 may be configured to select and provide printable characters to the execution module 220 as the input 212. The execution module 220 may execute the unknown binary program 214 using the first printable character as the input 212. The execution module 220 may record a number of instructions performed by the unknown binary program 214 during the execution of the unknown binary program 214 using the input 212. The number of performed instructions may be output by the execution module 220 as the instruction count 222. The instruction count 222 may be provided to the input module 210.

The input module 210 may determine whether the instruction count 222 is above a threshold range. The input module 210 may determine that the first printable character may be a candidate for inclusion as a valid input in a state for the unknown binary program 214 when the instruction count 222 is above the threshold range. The input module 210 may determine that the first printable character may not be a candidate for inclusion as a valid input in the first state for the unknown binary program 214 when the instruction count 222 is below or equal to the threshold range.

The threshold range may be determined based on a mode of the number of executed instructions and a testing constant. The mode may include the mode for the number of executed instructions. For example, the number of executed instructions may be stored in a set. The set may include one or more number values. The number values may represent the number of instructions executed for each input 212 provided by the input module 210. For example, assume that a first input resulted in one hundred instructions being executed. The number value for the first input may be the number "one hundred." The set may include other number values for other inputs. The mode may include the number value that appears most often in the set.

The testing constant may be referred to as "epsilon" or "the testing constant." The testing constant may include any positive real number. The upper limit of the threshold range may be determined by adding the testing constant to the mode.

When the first printable character is not a candidate for the valid input in the state for the unknown binary program 214, the input module 210 may provide a second printable character to the execution module 220 for execution. In a similar manner, the input module 210 may determine if the second printable character is a candidate for inclusion as a valid input in the state for the unknown binary program 214. The process 200 may continue to operate as indicate until the input module 210 determines a character that is a candidate for inclusion in a valid input in a state of the unknown binary program 214.

The input module 210 may concatenate another character with the candidate character to form the input 212. In particular, the input module 210 may place the first candidate character in a first index location and the other character in a second index location. In these and other embodiments, the concatenation of the candidate character and the other character may be referred as a partial valid input. The input module 210 may provide the input 212 to the execution module 220.

The execution module 220 may execute the unknown binary program 214 using the input 212. Based on the execution of the unknown binary program 214, the execution module 220 may output the instruction count 222. The input module 210 may determine if the other character in the second index location may be a candidate for inclusion in the valid input in a state for the unknown binary program 214 based on the instruction count 222.

The process 200 may continue in a similar manner until all or a majority of valid inputs that may be determined by the process 200 for a state of the unknown binary program 214 is determined.

In some embodiments, the input module 210 may combine the valid inputs to form the input sequences 230. In some embodiments, the inputs for the input sequences 230 may be commands and their associated arguments In these and other embodiments, the process 200 may determine a valid argument for a command in a similar manner as a command is found except the process 200 may provide the command as an input along with the possible printable characters to determine a valid argument for a given command.

In some embodiments, the input module 210 may construct all possible input sequence permutations of a prescribed input sequence length for determined valid inputs and may provide all of the input sequence permutations as the input sequences 230. Modifications, additions, or omissions may be made to the process 200 without departing from the scope of the present disclosure.

Figure 3:
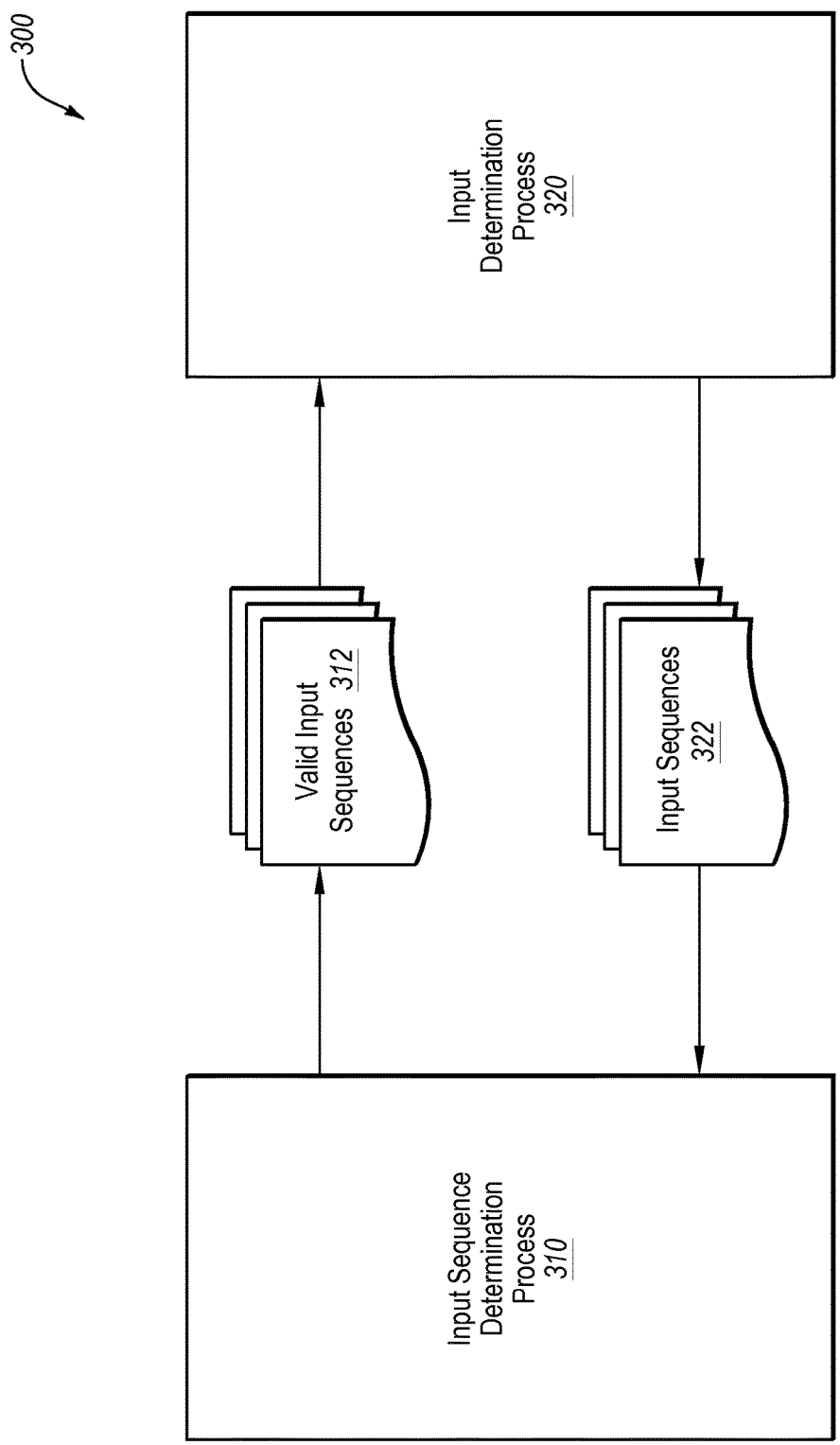
FIG. 3 illustrates an example input and input sequence determination process.

FIG. 3 illustrates an example input and input sequence determination process 300, which may be arranged in accordance with at least one embodiment described in this disclosure. In some embodiments, the process 300 may include an input sequence determination process 310 and an input determination process 320.

The input sequence determination process 310 may be similar to the process 100 discussed with respect to FIG. 1. The input sequence determination process 310 may be configured to determine valid input sequences 312 and provide the valid input sequences 312 to the input determination process 320. The input determination process 320 may be similar to the process 200 discussed with respect to FIG. 2. The input determination process 320 may be configured to determine input sequences 322 based on valid inputs and provide the input sequences 322 to the input sequence determination process 310.

An example of the operation of the process 300 follows. The input determination process 320 may determine multiple valid first inputs for a first state of an unknown binary program. The input determination process 320 may determine input sequences 322 based on the multiple valid first inputs for the first state and provide the input sequences 322 to the input sequence determination process 310.

The input sequence determination process 310 may receive the input sequences 322 and determine which of the input sequences 322 are valid input sequences for the first state of the unknown binary program. The valid input sequences may cause the unknown binary program to enter a second state. The input sequence determination process 310 may provide the valid input sequences 312 for the first state to the input determination process 320.

The input determination process 320 may receive the valid input sequences 312. Using the valid input sequences 312, the input determination process 320 may execute the unknown binary program and cause the unknown binary program to enter the second state. While in the second state, the input determination process 320 may determine additional valid inputs that were not valid inputs in the first state. The additional valid inputs may be valid second state inputs.

In some embodiments, the input determination process 320 may combine the first state inputs and the second state inputs to determine input sequences 322 for the second state. Alternately or additionally, the input determination process 320 may use second state inputs and not first state inputs to determine input sequences 322 for the second state. The input determination process 320 may provide the second state input sequences 322 to the input sequence determination process 310.

The input sequence determination process 310 may determine which of the input sequences 322 for the second state are valid input sequences 312. The valid input sequences 312 for the second state may cause the unknown binary program to enter a third state. The input sequence determination process 310 may provide the valid input sequences 312 for the second state to the input determination process 320. The process 300 may continue to determine valid inputs and valid input sequences 312 in any number of states following the process 300 as discussed in this disclosure.

In some embodiments, the input determination process 320 may be configured to vary the length of the input sequences 322. For example, in some embodiments the input sequences 322 from a first state may be a first length while an input sequence 322 from a second state may be a second length that is longer or shorter than the first length. In some embodiments, the input sequences 322 for a first state may be of varying length. In these and other embodiments, the input sequences 322 for a first state may include all possible combinations/permutation of the valid inputs determined by the input determination process 320 for the first state and any previous state. For example, assume that the input determination process 320 determines three valid inputs, A, B, and C. The input sequences 322 for the inputs A, B, and C may include A, B, C, AB, AC, BA, BC, CA, CB, ABC, ACB, BAC, BCA, CAB, and CBA. Alternately or additionally, the input sequences 322 for a first state may include some or all possible combinations/permutation of the valid inputs determined by the input determination process 320 for the first state and any previous state. In some embodiments, ordering of the inputs in an input sequence may cause an input sequence 322 to be different from another input sequence 322. For example, the input sequence AB may be different than the input sequence BA. Alternately or additionally, the ordering of the inputs in an input sequence may not cause the input sequence to be different.

The process 300 may be configured to provide a method to determine multiple different valid inputs and valid input sequences to traverse multiple different states within an unknown binary program. In this manner, one or more sequences of inputs that may cause an unknown binary program to behave in a manner inconsistent with proper operation, such as crashing, glitching, or otherwise behaving improperly may be determined. Furthermore, the ability of the process 300 to determine valid inputs and valid input sequences 312 may allow for proper evaluation and/or operation of an unknown binary program. Other advantages and uses of the process 300 and other process in this disclosure are also considered and contemplated.

Modifications, additions, or omissions may be made to the process 300 without departing from the scope of the present disclosure. For example, the input sequence determination process 310 and the input determination process 320 may be combined into a single process. In these and other embodiments, the execution module and other modules of the input sequence determination process 310 and the input determination process 320 may be shared.

Figure 4:
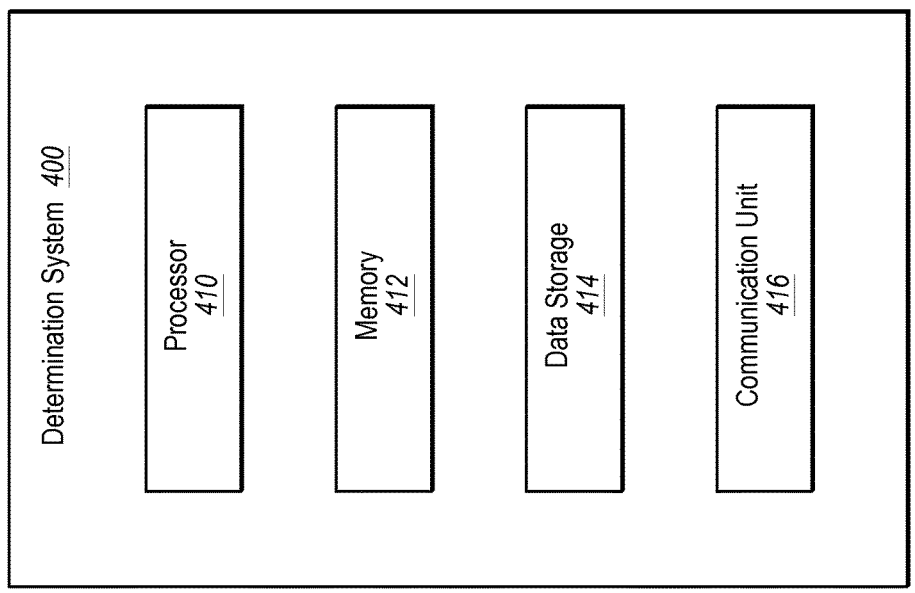
FIG. 4 is a block diagram of an example input determination system.

FIG. 4 is a block diagram of an example input determination system 400, which may be arranged in accordance with at least one embodiment described in this disclosure. As illustrated in FIG. 4, the system 400 may include a processor 410, a memory 412, a data storage 414, and communication unit 416.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, it is understood that the processor 410 may include any number of processors distributed across any number of network or physical locations that are configured to perform individually or collectively any number of operations described herein. In some embodiments, the processor 410 may interpret and/or execute program instructions and/or process data stored in the memory 412, the data storage 414, or the memory 412 and the data storage 414. In some embodiments, the processor 410 may fetch program instructions from the data storage 414 and load the program instructions in the memory 412. After the program instructions are loaded into the memory 412, the processor 410 may execute the program instructions, such as instructions to perform the process 100, the process 200, the process 300 and/or the method 500 of FIGS. 1, 2, 3, and 5, respectively.

The memory 412 and the data storage 414 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 416 may be configured to receive an unknown binary program and to provide the unknown binary program to the data storage 414. After being received by the data storage 414, inputs and input sequences for the unknown binary program using the processor 410 and instructions stored in the data storage. In some embodiments, determined inputs and input sequences may be provided outside the system 400 using the communication unit 416.

Modifications, additions, or omissions may be made to the system 400 without departing from the scope of the present disclosure. For example, the data storage 414 may be located in multiple locations and accessed by the processor 410 through a network.

Figure 5:
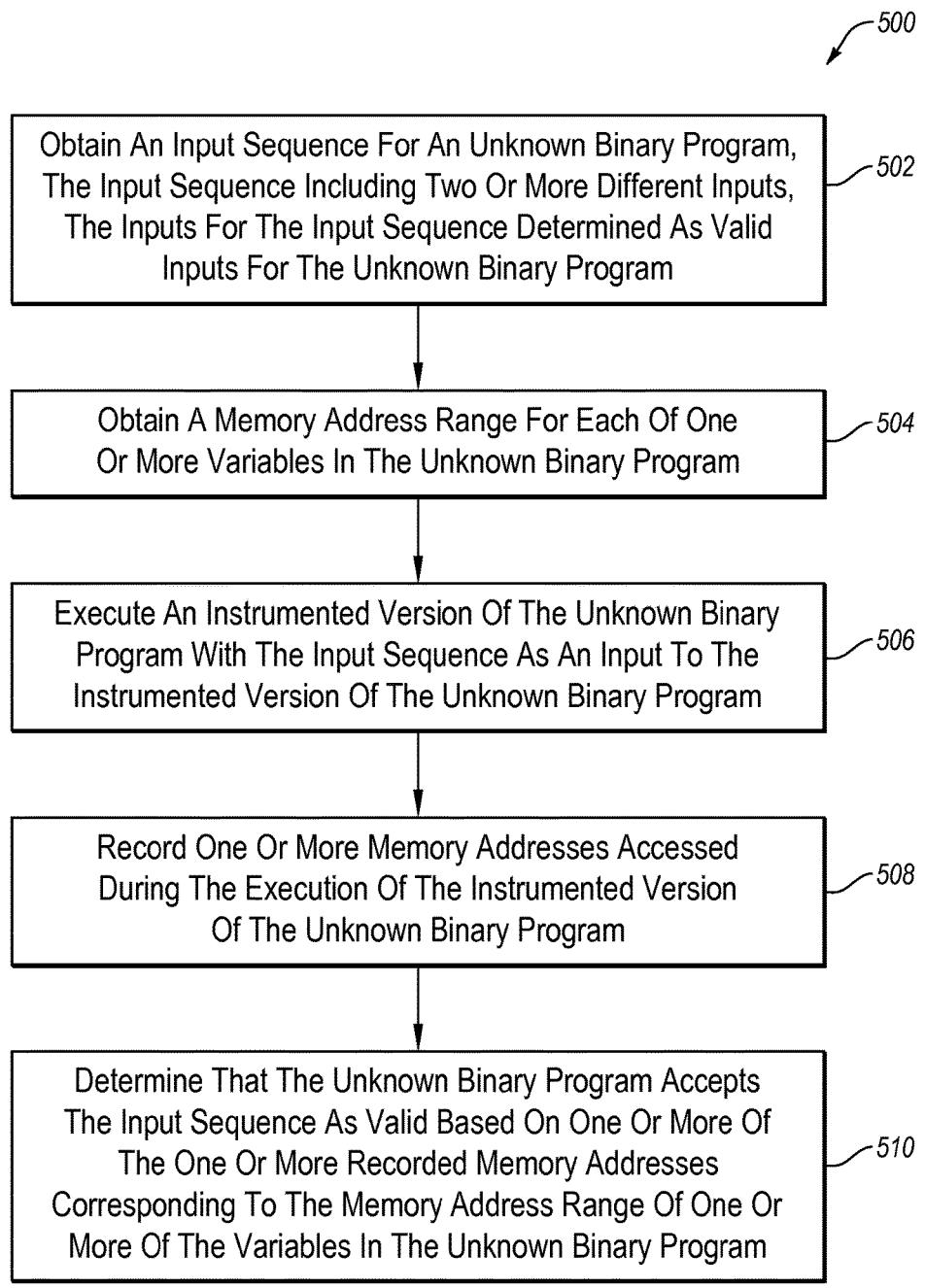
FIG. 5 is a flow chart of an example method to determine a valid input sequence for an unknown binary program.

FIG. 5 is a flow chart of example method 500 to determine a valid input sequence for an unknown binary program, which may be arranged in accordance with at least one embodiment described in this disclosure. The method 500 may be implemented, in some embodiments, by a system, such as the system 400 of FIG. 4. Although illustrated as discrete blocks, various blocks may be divided into additional blocks, combined into fewer blocks, or eliminated, depending on the desired implementation.

The method 500 may begin at block 502, where an input sequence for an unknown binary program may be obtained. The input sequence may include two or more different inputs. The inputs for the input sequence may have been determined as valid inputs for the unknown binary program. In some embodiments, one or more of the inputs may include a command determined as valid for the unknown binary program and an argument associated with the command. In some embodiments, the argument may also be determined as valid for the unknown binary program.

In block 504, a memory address range for each of one or more variables in the unknown binary program may be obtained. In some embodiments, the variables may be either static variables, global variables, or both static and global variables. In some embodiments, the memory address ranges may be located within a data section, a BSS section, or both the data section and BSS section of the unknown binary program.

In block 506, an instrumented version of the unknown binary program may be executed with the input sequence as an input to the instrumented version of the unknown binary program.

In block 508, one or more memory addresses accessed during the execution of the instrumented version of the unknown binary program may be recorded. In some embodiments, a memory addresses may be accessed when the memory address is either read from or written to. Alternately or additionally, a memory address is accessed when the memory address is both read from and written to.

In block 510, it may be determined that the unknown binary program accepts the input sequence as valid based on one or more of the one or more recorded memory addresses corresponding to the memory address range of one or more of the variables in the unknown binary program.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may further include instrumenting the unknown binary program by adding additional code instructions in the unknown binary program that outputs memory addresses accessed by the unknown binary program when executed.

In some embodiments, the input sequence may be a first input sequence and the memory addresses may be first memory addresses. In these and other embodiments, the method 500 may further include obtaining a second input sequence for the unknown binary program and executing the instrumented version of the unknown binary program using the first input sequence and the second input sequence as inputs to the instrumented version of the unknown binary program. In these and other embodiments, the method 500 may further include recording one or more second memory addresses accessed during the execution of the instrumented version of the unknown binary program during and after the second input sequence is input to the instrumented version of the unknown binary program and determining that the unknown binary program accepts the second input sequence as valid based on the one or more of the one or more recorded second memory addresses corresponding to the memory address range of one or more of the variables in the unknown binary program.

In some embodiments, the input sequence may be a first input sequence and the memory addresses may be first memory addresses. In these and other embodiments, the method 500 may further include executing the unknown binary program by providing the first input sequence and then providing a character sequence as inputs. The method 500 may also include recording an instruction count of the unknown binary program and determining the character sequence is a valid input based on the instruction count. The method 500 may further include generating a second input sequence using the character sequence.

In these and other embodiments, the method 500 may further include executing the instrumented version of the unknown binary program with the first input sequence and the second input sequence as inputs to the instrumented version of the unknown binary program. In these and other embodiments, the method 500 may further include recording one or more second memory addresses accessed during the execution of the instrumented version of the unknown binary program during and after the second input sequence is input and determining that the unknown binary program accepts the second input sequence as valid based on one or more of the one or more recorded second memory addresses corresponding to the memory address range of one or more of the variables in the unknown binary program.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to determine a valid input sequence for an unknown stateful binary program, the method comprising:
   obtaining an unknown stateful binary program including a first state and a second state;
   obtaining inputs for the unknown stateful binary program;
   determining that the inputs are valid for the first state of the unknown stateful binary program, for each of the inputs the determining including:
      executing the unknown stateful binary program in the first state without a transition to the second state with one of the inputs as input to the unknown stateful binary program in the first state;
      determining a number of instructions executed during the execution of the unknown stateful binary program with the one of the inputs as input; and comparing the number of executed instructions to a threshold number of instructions;

after determining that the inputs are valid, obtaining an input sequence for the unknown stateful binary program, the input sequence including a subset of two or more of the inputs determined to be valid;

obtaining a memory address range for each of one or more variables in the unknown stateful binary program;

executing an instrumented version of the unknown stateful binary program with the input sequence as input to the instrumented version of the unknown stateful binary program, wherein the executing of the instrumented version of the unknown stateful binary program with the input sequence as the input causes the unknown stateful binary program to enter the second state and the executing of the instrumented version of the unknown stateful binary program with fewer than the subset of inputs as the input does not cause the unknown stateful binary program to enter the second state;

recording one or more memory addresses accessed during the execution of the instrumented version of the unknown stateful binary program; and determining that the unknown stateful binary program accepts the input sequence as valid based on one or more of the one or more recorded memory addresses corresponding to the memory address range of one or more of the variables in the unknown stateful binary program.

2. The method of claim 1, wherein the variables are either static variables, global variables, or both static and global variables.

3. The method of claim 1, wherein the memory address ranges are located within a data section, a Block Started by Symbol (BSS) section, or both the data section and BSS section of the unknown stateful binary program.

4. The method of claim 1, wherein one or more of the inputs includes a command determined as valid for the unknown stateful binary program and an argument associated with the command, the argument also determined as valid for the unknown stateful binary program.

5. The method of claim 1, wherein a memory address is accessed when the memory address is either read from or written to.

6. The method of claim 1, wherein a memory address is accessed when the memory address is both read from and written to.

7. The method of claim 1, further comprising instrumenting the unknown stateful binary program by adding additional code instructions in the unknown stateful binary program that outputs memory addresses accessed by the unknown stateful binary program when executed.

8. The method of claim 1, wherein the input sequence is a first input sequence and the memory addresses are first memory addresses, wherein the method further comprises:
obtaining a second input sequence for the unknown stateful binary program;
executing the instrumented version of the unknown stateful binary program using the first input sequence and the second input sequence as inputs to the instrumented version of the unknown stateful binary program;
recording one or more second memory addresses accessed during the execution of the instrumented version of the unknown stateful binary program during and after the second input sequence is input to the instrumented version of the unknown stateful binary program; and determining that the unknown stateful binary program accepts the second input sequence as valid based on the one or more of the one or more recorded second memory addresses corresponding to the memory address range of one or more of the variables in the unknown stateful binary program.

9. The method of claim 1, wherein the input sequence is a first input sequence and the memory addresses are first memory addresses, wherein the method further comprises:
executing the unknown stateful binary program by providing the first input sequence and then providing a character sequence as inputs;
recording an instruction count of the unknown stateful binary program;
determining the character sequence is a valid input based on the instruction count; and
generating a second input sequence using the character sequence.

10. The method of claim 9, further comprising:
executing the instrumented version of the unknown stateful binary program with the first input sequence and the second input sequence as inputs to the instrumented version of the unknown stateful binary program;
recording one or more second memory addresses accessed during the execution of the instrumented version of the unknown stateful binary program during and after the second input sequence is input; and
determining that the unknown stateful binary program accepts the second input sequence as valid based on one or more of the one or more recorded second memory addresses corresponding to the memory address range of one or more of the variables in the unknown stateful binary program.

11. One or more non-transitory computer readable media that include instructions that when executed by one or more processors perform operations to determine valid input sequence for an unknown stateful binary program, the operations comprising:
obtain an unknown stateful binary program including the first state and a second state;
obtain inputs for the unknown stateful binary program;
determine that the inputs are valid for a first state of the unknown stateful binary program, for each of the inputs the determining including:
execute the unknown stateful binary program in the first state without a transition to the second state with one of the inputs as input to the unknown stateful binary program in the first state;
determine a number of instructions executed during the execution of the unknown stateful binary program with the one of the inputs as input; and
compare the number of executed instructions to a threshold number of instructions;
after determining that the inputs are valid, obtain an input sequence for the unknown stateful binary program, the input sequence including a subset of two or more of the inputs determined to be valid;
obtain a memory address range for each of one or more variables in the unknown stateful binary program;
execute an instrumented version of the unknown stateful binary program with the input sequence as an input to the instrumented version of the unknown stateful binary program, wherein the executing of the instrumented version of the unknown stateful binary program with the input sequence as the input causes the unknown stateful binary program to enter a second state and the executing of the instrumented version of the unknown stateful binary program with ewer than the subset of inputs as the input does not cause the unknown stateful binary program to enter the second state;

record one or more memory addresses accessed during the execution of the instrumented version of the unknown stateful binary program; and determine that the unknown stateful binary program accepts the input sequence as valid based on one or more of the one or more recorded memory addresses corresponding to the memory address range of one or more of the variables in the unknown stateful binary program.

12. The one or more non-transitory computer readable media of claim 11, wherein the variables are either static variables, global variables, or both static and global variables.

13. The one or more non-transitory computer readable media of claim 11, wherein the memory address ranges are located within a data section, a Block Started by Symbol (BSS) section, or both the data section and BSS section of the unknown stateful binary program.

14. The one or more non-transitory computer readable media of claim 11, wherein one or more of the inputs includes a command determined as valid for the unknown stateful binary program and an argument associated with the command, the argument also determined as valid for the unknown stateful binary program.

15. The one or more non-transitory computer readable media of claim 11, wherein a memory address is accessed when the memory address is either read from or written to.

16. The one or more non-transitory computer readable media of claim 11, wherein a memory address is accessed when the memory address is both read from and written to.

17. The one or more non-transitory computer readable media of claim 11, wherein the operations further comprise instrumenting the unknown stateful binary program by adding additional code instructions in the unknown stateful binary program that output memory addresses accessed by the unknown stateful binary program when executed.

18. The one or more non-transitory computer readable media of claim 11, wherein the input sequence is a first input sequence and the memory addresses are first memory addresses, wherein the operations further comprise:

obtain a second input sequence for the unknown stateful binary program;

execute the instrumented version of the unknown stateful binary program using the first input sequence and the second input sequence as inputs to the instrumented version of the unknown stateful binary program;

record one or more second memory addresses accessed during the execution of the instrumented version of the unknown stateful binary program during and after the second input sequence is input to the instrumented version of the unknown stateful binary program; and determine that the unknown stateful binary program accepts the second input sequence as valid based on the one or more of the one or more recorded second memory addresses corresponding to the memory address range of one or more of the variables in the unknown stateful binary program.

19. The one or more non-transitory computer readable media of claim 11, wherein the input sequence is a first input sequence and the memory addresses are first memory addresses, wherein the operations further comprise:

execute the unknown stateful binary program by providing the first input sequence and then providing a character sequence as inputs;

record an instruction count of the unknown stateful binary program;

determine the character sequence is a valid input based on the instruction count; and generate a second input sequence using the character sequence.

20. The one or more non-transitory computer readable media of claim 19, wherein the operations further comprise:

execute the instrumented version of the unknown stateful binary program with the first input sequence and the second input sequence as inputs to the instrumented version of the unknown stateful binary program;

record one or more second memory addresses accessed during the execution of the instrumented version of the unknown stateful binary program during and after the second input sequence is input; and determine that the unknown stateful binary program accepts the second input sequence as valid based on one or more of the one or more recorded second memory addresses corresponding to the memory address range of one or more of the variables in the unknown stateful binary program.

* * * * *